(12) United States Patent
Rohland

(10) Patent No.: US 8,966,737 B2
(45) Date of Patent: Mar. 3, 2015

(54) METHOD AND ARRANGEMENT IN ARRANGING AN ALUMINIUM FERRULE TO A HIGH STRENGTH EYE OF A STEEL WIRE

(75) Inventor: Bernhard Rohland, Mölndal (SE)

(73) Assignee: Talurit AB, Västra Frölunda (SE)

( * ) Notice: Subject to any disclaimer, the term of this patent is extended or adjusted under 35 U.S.C. 154(b) by 0 days.

(21) Appl. No.: 13/699,716

(22) PCT Filed: May 25, 2010

(86) PCT No.: PCT/SE2010/000142
§ 371 (c)(1),
(2), (4) Date: Nov. 24, 2012

(87) PCT Pub. No.: WO2011/149390
PCT Pub. Date: Dec. 1, 2011

(65) Prior Publication Data
US 2013/0067694 A1    Mar. 21, 2013

(51) Int. Cl.
*F16G 11/02*    (2006.01)
*A44B 13/00*    (2006.01)
*B21F 15/06*    (2006.01)
*B21F 45/14*    (2006.01)

(52) U.S. Cl.
CPC ............. *A44B 13/00* (2013.01); *B21F 15/06* (2013.01); *B21F 45/14* (2013.01); *F16G 11/02* (2013.01)
USPC .......... 29/517; 24/114.5; 24/115 A; 24/703.1; 403/212

(58) Field of Classification Search
USPC .............. 24/115 A, 114.5, 20 W, 129 W, 24/703.1–703.6, 136 L, 115 R, 115 H, 24/115 K; 403/212, 214, 210, 284; 29/517, 29/518; 174/90
See application file for complete search history.

(56) References Cited

U.S. PATENT DOCUMENTS 2,849,771 A * 9/1958 Rohland .................. 403/212
2,869,906 A * 1/1959 Person ..................... 403/212
3,032,846 A * 5/1962 Stanton et al. ........... 403/212
3,367,102 A * 2/1968 Meger ....................... 57/202

FOREIGN PATENT DOCUMENTS

FR    2495851 A1 *  6/1982
GB     767363 A  *  1/1957
(Continued)

OTHER PUBLICATIONS

Swedish Patent Office, Int'l Search Report in PCT/SE2010/000142, Feb. 8, 2011.

*Primary Examiner* — Robert J Sandy
*Assistant Examiner* — Abigail Morrell
(74) *Attorney, Agent, or Firm* — Piedmont Intellectual Property

(57) ABSTRACT

Method and arrangement in arranging an aluminium ferrule (2) to an eye (5) of a high strength steel wire rope (6) for fixation purposes, the ferrule (2) is pressed to securely fix said eye (5) and supposed to keep its diameter within a certain standard limit up to a minimum breaking load, dependant on the dimension of said wire rope (6). A ring (1) made from steel having an internally congruent shape but a smaller cross section than that of the ferrule (2) is arranged most close to said eye (5) before said ferrule (2) are together with the steel ring (1) is pressed in a conventional ferrule pressing tool to obtain a eye that is more stable with regard to its dimensions within said standard limit values.

4 Claims, 3 Drawing Sheets

(56) References Cited

FOREIGN PATENT DOCUMENTS

| GB | 896468 | A |   | 5/1962 |
| GB | 1074527 | A |   | 7/1967 |
| GB | 1256090 | A |   | 12/1971 |
| GB | 1483194 | A | * | 8/1977 |

* cited by examiner

METHOD AND ARRANGEMENT IN ARRANGING AN ALUMINIUM FERRULE TO A HIGH STRENGTH EYE OF A STEEL WIRE

TECHNICAL FIELD

The present invention relates to a method as well as an arrangement in applying an aluminium ferrule to an eye of a high strength steel wire rope for fixation purposes, in which the ferrule is pressed to securely fix said eye and supposed to keep its diameter within a certain standard limit up to a minimum breaking load, dependant on the dimension of said wire rope.

TECHNICAL BACKGROUND

In recent times, however, the use of high strength steel wire ropes in all kinds of lifting and pulling appliances has become more and more required and consequently also demanded. As a consequence standardised ferrules made from aluminium, that are used to arrange an eye to an end of such a wire rope, no longer match the requirements regarding earlier established standards. Such standards inter alia prescribe that a certain ferrule applied to a steel wire rope is to be tested by applying a load thereto of at least 90% of a minimum breaking load, whereafter the diameter of the ferrule is to be measured. Said diameter should then not be greater than a certain threshold level in order to be within certified limits. Since such standards are not easily changed, a database search was initiated on the subject with the aim to find a solution to the problem, however, this was without tangible results. As a consequence a product development work was initiated, which has now been finalised, resulting in an unexpected and as we see it, inventive solution to the problem above reflected.

SUMMARY OF THE INVENTION

The object of the present invention is to solve the above problem and enable a method and an arrangement in applying an aluminium ferrule to an eye of a high strength steel wire rope while still matching historically established standards with regard to dimensional stability, i.e. diameter to ferrules made from such relatively easily formed materials as aluminium in their pressed fixed steady state also when combined with such high strength steel wire ropes. Said object is achieved by a method and a device of the type defined by way of introduction. The method according to the invention is characterised in that, a ring made from steel having an internally congruent shape but with a lesser cross section area than that of the ferrule is arranged most close to said eye before said ferrule, together with the steel ring is pressed in a conventional ferrule pressing tool to obtain a eye that is more stabile with regard to its dimensions to keep it within said standard. The arrangement according to the invention is characterised in that it comprise a steel ring with an internally congruent shape but of a lesser cross section in comparison to a conventional ferrule blank made from aluminium, wherein the steel ring is applied to an inner part of a ferrule termination most close to its eye with the conventional ferrule placed at a distance equaling the length of the steel ring from the eye. With a method and an arrangement according to the invention splitting up of an aluminium ferrule when subjected to a minimum break load is avoided, even if a material of grade 2160 instead of one of grade 1960, with or without a thimble, is used even to such an extent as a specific standard for this purpose numbered EN 13411-3 and named "Terminations for steel wire ropes—Safety—Part 3: Ferrules and ferrule securing" is upheld.

With the method and the arrangement according to the invention the floating of the aluminium ferrule during pressing thereof is not notably affected by said steel ring in comparison to an equal pressing of an aluminium ferrule alone. Consequently dimensioning of an aluminium ferrule termination can be made using the above mentioned standard in spite of the higher transverse forces occurring as a consequence of the higher loadability of the high strength steel wire rope from grade 2160 as compared to conventional steel wire rope instead from grade 1960 as discussed above. This also means that the aluminium ferrule keeps its full resistance strength in spite of the use of a higher grade steel wire rope even when tested according to said standard.

It is according to the invention a great advantage to be able to follow the standard EN 13411-3 for selection of ferrules for higher tensile grade of wire ropes, which indirectly also leads to that it becomes possible to use the same dies as when the standard ferrule only is used.

It is further an advantage to be able to provide the steel ring in question with a proper corrosion protection such as hot-dip galvanising before its application as a strengthening element. Finally it is also advantageous to be able to obtain full strength of a ferrule application also when using thimbles in the steel wire rope eye, which normally otherwise can be critical with regard to dimensional stability, mentioned above.

BRIEF DESCRIPTION OF THE DRAWINGS

The invention will in the following be described more in detail by reference to the enclosed drawings, in which.

DETAILED DESCRIPTION OF THE INVENTION

Figure 1:
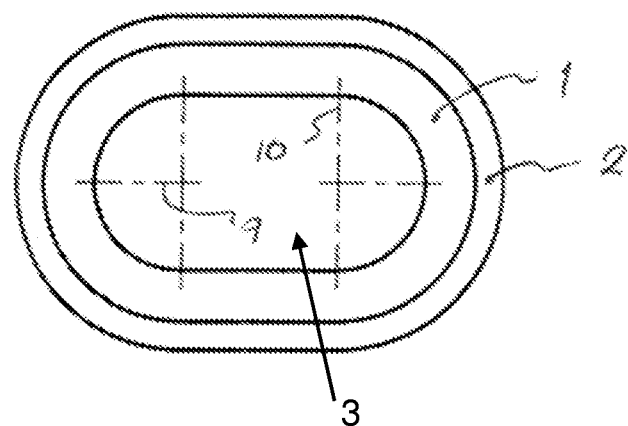
FIG. 1 shows a front side view of a steel ring and a ferrule before pressing thereof, from an end of the combination where an eye is to protrude.
Figure 2:
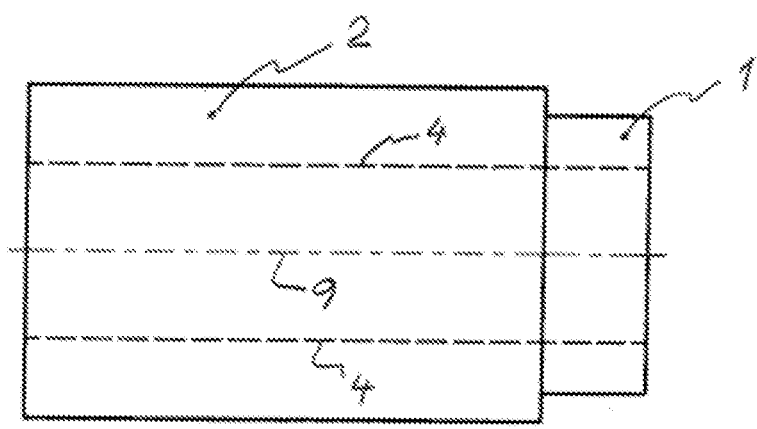
FIG. 2 shows a narrow side length side view of the same arrangement as in FIG. 1.
Figure 3:
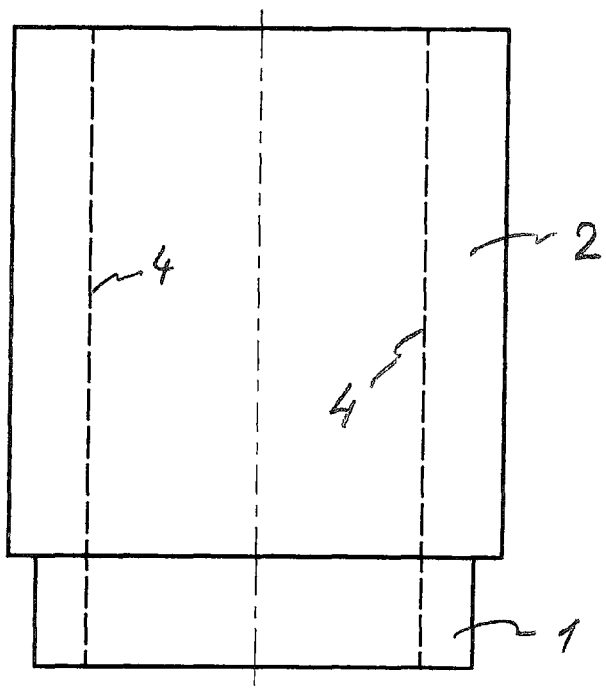
FIG. 3 shows a flat side length side view of the same arrangement as in FIG. 1.

In a front side view, FIG. 1 shows a steel ring 1 and an aluminium ferrule 2 placed close to each other before introducing an eye (not shown) through a congruent opening 3 of both the ring 1 and the ferrule 2. As a consequence the ring 1 and the ferrule 2 are shown as blanks, i.e. before pressing thereof into a bonding unit 8 for an eye 5 of a steel wire rope 6 (not shown in this fig). FIG. 2 shows as a narrow side length side view the units 1 and 2 lined up, the one after the other. The hidden contours 4 shown, clearly indicates that the inner dimensions of the steel ring 1 and the ferrule 2 are the same, while the outer dimensions of these parts diverge, i.e. the steel ring 1 being smaller. FIG. 3 shows a similar view as that of FIG. 2, however, from a flat side length side of the steel ring 1 and the ferrule arranged close to each other.

Figure 4:
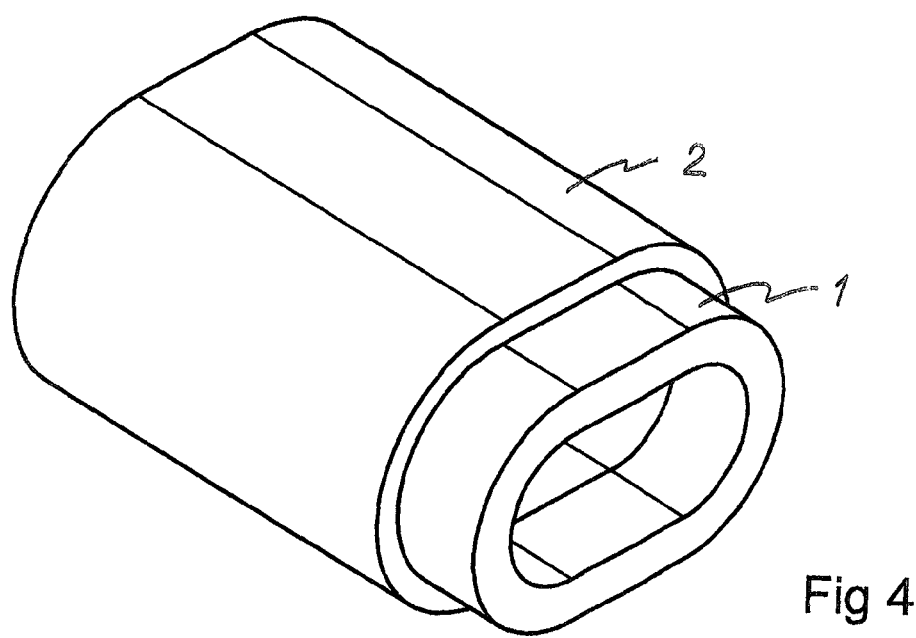
FIG. 4 shows a perspective view of an aluminium ferrule together with a steel ring as in FIG. 1.

FIG. 4 shows the blanks, ie. the ring 1 and the aluminium ferrule 2 as a perspective view obliquely from above, otherwise in a relative position as in FIGS. 1 through 3.

Figure 5:
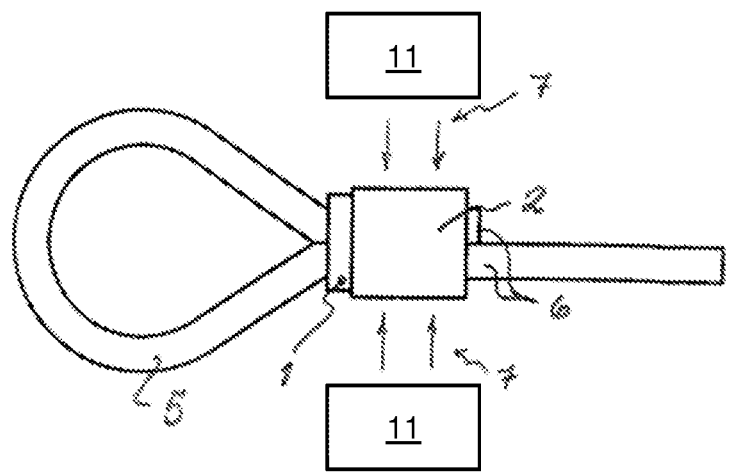
FIG. 5 shows a side view of an eye with a ferrule and a steel ring according to the invention before the arrangement is pressed together
Figure 6:
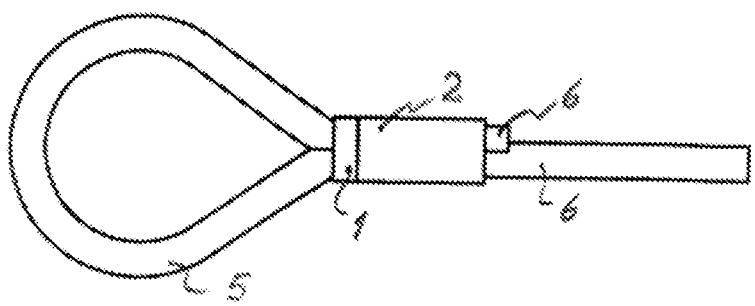
FIG. 6 shows a side view of the same eye as in FIG. 1, however, in a ready pressed steady state.
Figure 7:
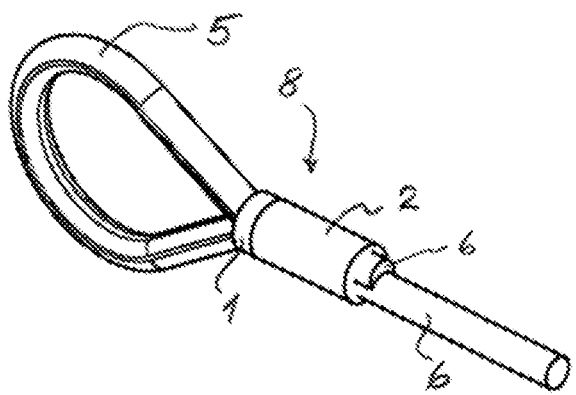
FIG. 7 shows a perspective view of a terminated eye with an aluminium ferrule and a steel ring according to the invention

In FIG. 5 an arrangement including a eye 5 from the steel wire rope 6 onto which a steel ring 1 and an aluminium ferrule 2 has been thread is shown, while the arrangement still being in an uncompressed state, however, ready to be so compressed in a pressing tool 11 of a conventional kind. Arrows 7 shows a direction in which to apply a heavy compression force to the arrangement of the ring 1 and the ferrule 2, during which application the fixed bonding unit 8 comprising said eye 5, the ferrule 2 and the steel ring 1 is formed. As can be seen according to FIG. 6 and FIG. 7, the fixed unit 8 comprise a ferrule 2 and a steel ring 1 that has been deformed into an almost circular cross section as seen in the direction of the steel wire rope 6.

The function of the inventive method can be described according to the following. The fact that the outer dimensions of the steel ring 1 are different or diverge from those of the ferrule 2 can be explained by the fact that it is necessary that the process of arranging a eye to a steel wire rope can be made swiftly and I a simple way. Thus a conventional pressing tool is used both for initiating the compression of the aluminium ferrule 2 and to finalize the same while simultaneously also deforming the steel ring 1 to the same almost round shape as that of the finally pressed ferrule 2. Should the length of the steel ring 1 and the ferrule 2 be longer than the required length for pressing such a combination either two press operations has to be made or must a longer pressing tool be used. In order to work, the relative dimensions between the steel ring and the ferrule has to have a certain mutual relation, ie. the outer dimension of said ferrule is larger than that of the steel ring in order to obtain an initial pressing of the ferrule before the steel ring is pressed, to adapt itself while floating along the surface of the steel wire rope just up until where the eye starts to develop itself. Also the length of the steel ring in relation to that of the ferrule used in every single case has a relevant influential effect on the finally achieved resulting combination of a ferrule 2 and a steel ring 1, bonded to the two parts of a steel wire rope that finally constitutes an eye of the wanted kind. The bond developed is bound by the deformation of both the ferrule and the steel ring to adapt to the outer shape of the steel wire rope. Thus a ferrule/steel ring combination designed for a higher load should preferably be of a larger length than such a combination designed for a lesser.

When starting the compression of the unit 8 to be created, at first only the aluminium ferrule 2 is compressed due to the differences in original outer dimensions. During this initial compression, a certain initial bond is established between the aluminium of the ferrule 2 and the steel wire rope 6 while the aluminium of the ferrule 2 in a continuous fashion floats progressively within borders given by on the one hand the pressing tool (not shown) and on the other the steel ring 1.

While the pressing tool constitutes an "obstacle" that cannot be stopped, the steel ring 1 still has a certain ability to move towards the eye 5 due to the certain elasticity of thereof, being a property that has to do with the material actually chosen for a specific use in a steel wire rope 6. Anyway, the steel ring 1 is slid along both parts of the steel wire rope 6 constituting said eye 5 due to the floating of the aluminium of the ferrule and its grip on the two parts of the steel wire rope 6, until the compression from the pressing tool or the counter force from the elasticity of the eye 5 stops the steel ring 1 at a certain position, in which it is finally bonded to the parts of the steel wire rope under the influence of the pressing tool. The hardness of the steel in the steel ring 1 must for obvious reasons be of a quality having a lesser tensile strength than that of the pressing tool, while the final space between the two parts of the pressing tool as to its volume more or less equals the amount of steel in the steel ring 1 in its final compressed state around the two parts of the steel wire rope 6. Since this obviously is not the case with the aluminium ferrule 2 the pressing tool is equipped with cutting edges (not shown) which cuts off excess material at the time when the pressing tool is brought to close fully during compression of the ferrule 2.

The invention claimed is:

1. A method of forming an eye on a steel wire rope, comprising:
    bending an end portion of the rope such that a free end of the rope is folded onto a body portion of the rope, thereby defining the eye;
    arranging a steel ring and an aluminum ferrule onto the free end and the adjacent body portion of the rope such that the ring is closer to the eye than the ferrule;
    pressing the steel ring and the ferrule with a tool to securely fix the free end to the body portion of the rope, whereby stability of dimensions of the eye is increased; and
    wherein the steel ring defines an opening that is congruent to an opening defined by the ferrule, the steel ring has a smaller cross-sectional area than that of the ferrule, and the outer dimensions of the steel ring are different from outer dimensions of the ferrule before pressing.

2. The method of claim 1, wherein the ferrule and the steel ring are pressed simultaneously.

3. The method of claim 2, the pressing is performed in one step.

4. The method of claim 1, wherein pressing the ferrule is initiated before pressing the steel ring, and during pressing, the ferrule pushes the steel ring toward the eye until the tool reaches the steel ring, whereby the tool presses the steel ring into conformation with both the ferrule and the rope.

* * * * *